United States Patent
Prasad

(10) Patent No.: US 8,948,086 B2
(45) Date of Patent: Feb. 3, 2015

(54) COMMUNICATION METHOD WITH USER EQUIPMENT AND H(E) NB FOR MINIMIZING ACCESS NETWORK EXTENSION IMPACT

(75) Inventor: Anand Raghawa Prasad, Tokyo (JP)

(73) Assignee: NEC Corporation, Tokyo (JP)

( * ) Notice: Subject to any disclaimer, the term of this patent is extended or adjusted under 35 U.S.C. 154(b) by 802 days.

(21) Appl. No.: 13/124,871

(22) PCT Filed: Oct. 28, 2009

(86) PCT No.: PCT/JP2009/068864
§ 371 (c)(1),
(2), (4) Date: May 12, 2011

(87) PCT Pub. No.: WO2010/050612
PCT Pub. Date: May 6, 2010

(65) Prior Publication Data
US 2011/0222410 A1 Sep. 15, 2011

(30) Foreign Application Priority Data

Oct. 30, 2008 (JP) ................................ P2008-280073

(51) Int. Cl.
*H04W 12/06* (2009.01)
*H04W 12/12* (2009.01)
(Continued)

(52) U.S. Cl.
CPC ........... *H04W 12/12* (2013.01); *H04L 63/1408* (2013.01); *H04L 43/16* (2013.01)
USPC .................... 370/328; 726/4; 726/23; 726/28

(58) Field of Classification Search
None
See application file for complete search history.

(56) References Cited

U.S. PATENT DOCUMENTS

| 8,509,735 B2 * | 8/2013 | Thorson et al. ................ 455/410 |
| 2006/0230450 A1 * | 10/2006 | Bu et al. .......................... 726/22 |
| 2006/0236390 A1 | 10/2006 | Matovsky et al. |

(Continued)

FOREIGN PATENT DOCUMENTS

| CN | 101203052 A | 6/2008 |
| JP | 08-289045 A | 11/1996 |

(Continued)

OTHER PUBLICATIONS

Japanese Office Action for JP2008-225115 mailed on May 15, 2012.

(Continued)

*Primary Examiner* — Duc Duong
(74) *Attorney, Agent, or Firm* — Sughrue Mion, PLLC

(57) ABSTRACT

A communication method is adapted to a mobile communication system including a user equipment, a core network, and a small-scale radio base station, namely, a H(e) NB. The H(e) NB relays packets of data between the user equipment and the core network by way of radio communication with the user equipment and by way of wired communication with the core network. The H(e) NB monitors communications of the user equipment so as to compare the user communication information with a threshold value used for discerning unauthenticated communication from received communication, thus reducing the amount of data transferred between the core network and the user equipment performing the unauthenticated communication with exploitation. Thus, it is possible to prevent throughputs of data from decreasing due to unauthenticated exploitation of the H(e) NB with respect to the authenticated subscriber.

4 Claims, 3 Drawing Sheets

(51) Int. Cl.
*H04L 29/06* (2006.01)
*H04L 12/26* (2006.01)

(56) References Cited

U.S. PATENT DOCUMENTS

| | | | |
|---|---|---|---|
| 2007/0077931 A1 | 4/2007 | Glinka | |
| 2008/0081637 A1 | 4/2008 | Shii et al. | |
| 2008/0207170 A1* | 8/2008 | Khetawat et al. | 455/411 |
| 2009/0305671 A1* | 12/2009 | Luft et al. | 455/411 |
| 2010/0062768 A1 | 3/2010 | Lindqvist et al. | |
| 2013/0246535 A1* | 9/2013 | Yadava et al. | 709/206 |

FOREIGN PATENT DOCUMENTS

| | | |
|---|---|---|
| JP | 2001060955 A | 3/2001 |
| JP | 2005-51314 A | 2/2005 |
| JP | 2006340294 A | 12/2006 |
| JP | 2007036828 A | 2/2007 |
| JP | 2008092095 A | 4/2008 |
| JP | 2010521097 A | 6/2010 |
| WO | 2004104780 A2 | 12/2004 |

OTHER PUBLICATIONS

European Office Action for EP09752899.6 dated Sep. 19, 2012.
3GPP TR R3. 020 V0.8.0 (May 2008), 3GPP, Aug. 13, 2008, pp. 16-26.
Japanese Office Action for JP2011-517682 mailed on Jan. 18, 2013.
International Search Report for PCT/JP2009/068864 mailed Feb. 9, 2010.
3GPP TS 22.011 V8.3.0, "Technical Specification Group Services and System Aspects; Service Accessibility (Release 8)", Mar. 2008.
ETSI TS 122 011 V8.3.0, "Digital cellular telecommunications system (Phase 2+); Universal Mobile Telecommunications System (UMTS); Service accessibility (3GPP TS 22.011 version 8.3.0 Release 8)", Apr. 2008.
Chinese Office Action for CN Application No. 200980141597.9 issued on Oct. 25, 2013 with Partial English Translation.

* cited by examiner

| UE-ID | POLICY-STEP | COMMUNICATION RECORD |
|---|---|---|
| 12345678 | 0 | 2008/08/15 08:05 ; ⋯ |
| 17320508 | 0 | 2008/08/15 10:29 ; ⋯ |
| 22360679 | 2 | 2008/08/14 22:45 ; ⋯ |
| ⋮ | ⋮ | ⋮ |

COMMUNICATION METHOD WITH USER EQUIPMENT AND H(E) NB FOR MINIMIZING ACCESS NETWORK EXTENSION IMPACT

The present application is the National Phase of PCT/JP2009/068864, filed Oct. 28, 2009, which claims priority based on Japanese Patent Application No. 2008-280073, the content of which is incorporated herein by reference in its entirety.

TECHNICAL FIELD

The present invention relates to communication methods with the user equipments (UE) and the home-e node B (H(e) NB) based on the 3rd Generation Partnership Project (3GPP), which prevents unauthenticated exploitation (or improper appropriation) of communication networks that the user equipment connects to via radio base stations.

BACKGROUND ART

Due to the remarkable technological development in wired data communications, various networks based on the Internet protocol (IP) have become prevalent so as to provide various communication services such as high-speed and low-cost communication services. In contrast, IP radio communications using user equipments (UE) such as cellular phones and portable information terminals in mobile communications have not become prevalent compared to wired data communications.

The recent mobile communication technology has been developed to facilitate small-scale radio base stations, which enable communications in the femtocell ranging from several meters to several tens of meters, in homes and small offices (e.g. SOHO: Small Office Home Office), thus providing users with high-speed and low-cost communications. Small-scale radio base stations are devices that provide user equipments with mobile communications but that have limited capabilities of communications ranging from several meters to several tens of meters due to low radio output powers. Small-scale radio base stations are reduced in communication ranges and in the number of user equipments connected thereto so as to allocate relatively broad bands to user equipments, thus providing high-speed and low-cost communications.

Small-scale radio base stations are connected to core networks (CN) (which are wired communication networks) via the Internet or telephone lines such as digital subscriber lines (DSL).

The femtocell using small-scale radio base stations is advantageous for subscribers and mobile communication operators. Conventionally, a large number of radio base stations covering numerous user equipments are required to achieve wide communication areas, whereas since radio base stations are high-cost facilities, they impose heavy economic burdens on mobile communication operators. In contrast, small-scale radio base stations are low-cost devices which can be easily sold or rent on the market, thus reducing economic burdens on mobile communication operators. In addition, small-scale radio base stations which are set up by subscribers can be precisely installed in requested locations in mobile communications.

The 3GPP has developed the Home Node-B (H NB) and Home Evolved Node-B (H(e) NB) providing communications to the Closed Subscriber Group (CSG), which is disclosed in Non-Patent Document 1.

Non-Patent Document 1: 3GPP TS 22.011 V8.3.0 (2008-03), Technical Specification 3rd Generation Partnership Project; Technical Specification Group Services and System Aspects; Service Accessibility (Release 8)

Since small-scale radio base stations adapted to small offices and home offices (SOHO) are designed to use radio communications, they may slightly extend communication ranges in the surrounding area of SOHO. Small-scale radio base stations extending communication ranges outside the SOHO are likely exploited by unauthenticated persons without being detected by subscribers and operators.

For the purposes of extending communication ranges, providing mobile communications to visitors (who visit the SOHO), and providing mobile communications to requested user equipments, small-scale radio base stations may be frequently set to the open-access mode allowing subscribers of mobile communication networks to connect thereto; hence, they are vulnerable to unauthenticated exploitation.

When unauthenticated persons (e.g. intruders/attackers who exploit small-scale radio base stations by use of communication ranges extended in the periphery of or outside of the SOHO) dominate relatively large communication bands, authenticated subscribers and/or trusted subscribers (who are permitted to use small-scale radio base stations) may not secure adequate communication ranges.

It is difficult to specify unauthenticated persons who exploit small-scale radio base stations so as to connect to core networks, so that they may deliver jamming attacks on operators' services of mobile communication networks. In addition, unauthenticated persons may control user equipments connected to small-scale radio base stations so as to further enlarge communication ranges, thus fostering unauthenticated exploitation.

Several countermeasures can be taken against unauthenticated exploitation. For example, subscribers voluntarily designate closed subscriber groups including specific subscribers who are permitted to use small-scale radio base stations, thus preventing unauthenticated exploitation. However, there still remains a possibility that subscribers of closed subscriber groups and/or other persons who steal subscribers' user equipments may unauthentically exploit small-scale radio base stations so as to increase traffic in communications; this makes it difficult for authenticated subscribers to secure adequate communication bands.

DISCLOSURE OF INVENTION

The present invention seeks to solve the above problem, wherein the object thereof is to provide a communication method that prevents the throughput of data communication by the authenticated subscriber from decreasing due to the unauthenticated exploitation of a small-scale radio base station.

The present invention is directed to a communication method with a user equipment connected to a small-scale radio base station, namely a H(e) NB, via a core network. The H(e) NB relays data between the user equipment and the core network, and compares the user communication information of the user equipment with a threshold value used for discerning unauthenticated communication from received communication, thus reducing the amount of data transferred between the core network and the user equipment performing unauthenticated communication with exploitation.

The H(e) NB includes a network communication unit connected to the core network, a radio communication unit transmitting and/or receiving data in connection with the user equipment, and a communication restriction unit which is connected between the network communication unit and the radio communication unit so as to compare the user communication information with the threshold value, thus reducing the amount of data transferred between the core network and the user equipment performing unauthenticated communication with exploitation.

In the above, the H(e) NB reduces the number of packets of data transferred to the user equipment performing unauthenticated communication with exploitation. Thus, it is possible to avoid an unwanted situation in which authenticated or trusted subscribers using the H(e) NB do not secure adequate bands in communications.

BEST MODE FOR CARRYING OUT THE INVENTION

The present invention will be described by way of embodiments with reference to drawings, wherein user equipments communicate with small-scale radio base stations (i.e. H(e) NB).

Figure 1:
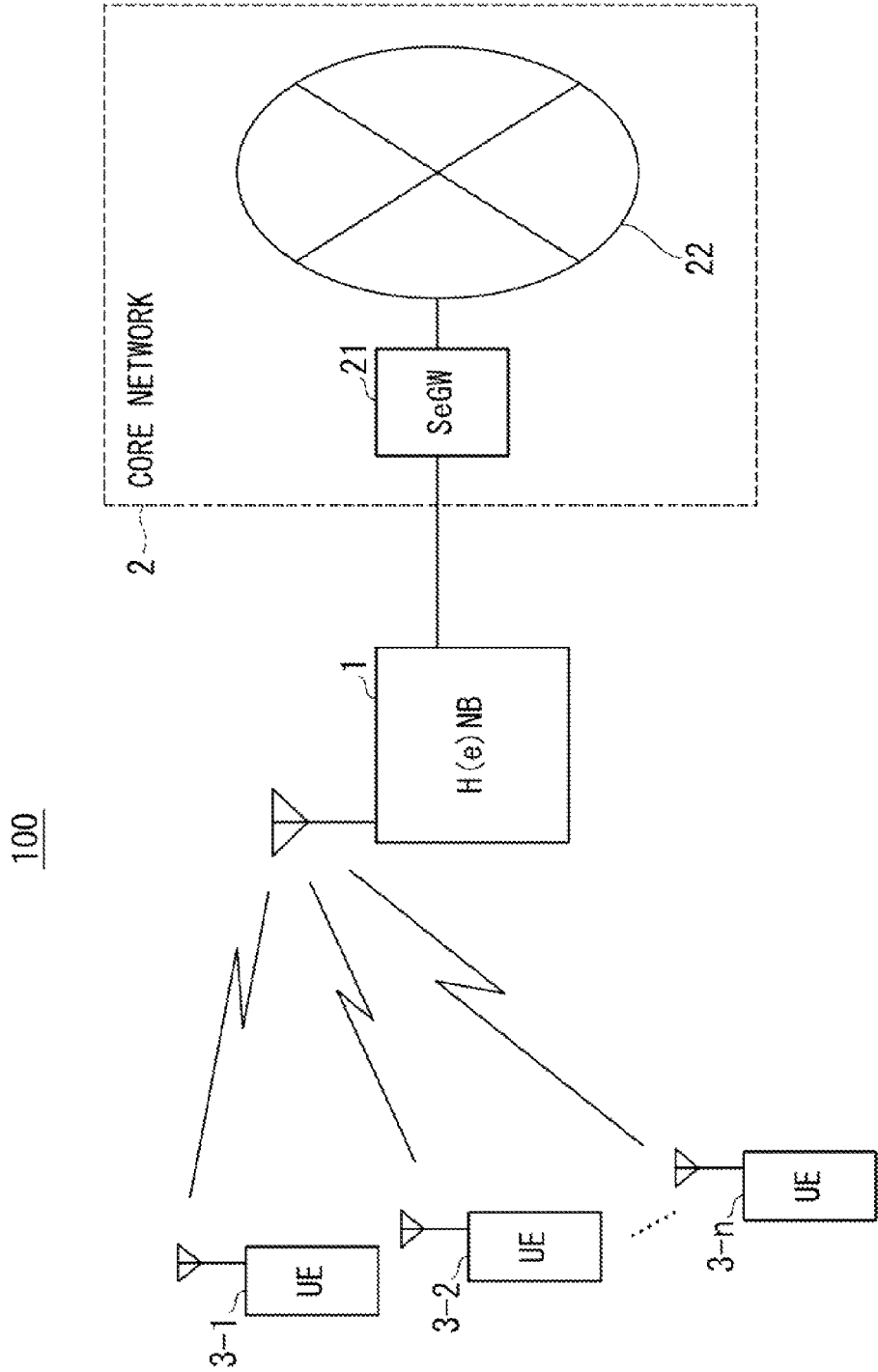
FIG. 1 is a block diagram showing the constitution of a mobile communication system according to the embodiment of the present invention.

FIG. 1 is a block diagram showing the constitution of a mobile communication system 100 according to the embodiment of the present invention. The mobile communication system 100 includes a H(e) NB 1, a core network 2, and a plurality of user equipments which are designated by reference numerals 3-1, 3-2, . . . , 3-n.

The H(e) NB 1 is connected to the core network 2 via wired lines such as the Internet and telephone lines. The core network 2 is configured to provide mobile communications and is constituted of a security gateway (SeGW) 21 and a communication network 22.

The user equipments 3-1, 3-2, . . . , 3-n (collectively denoted by the same reference numeral "3") are communication terminals capable of performing mobile communications, such as cellular phones and portable information terminals. The user equipments 3 have functions to connect to the core network 2 via the H(e) NB 1, thus performing communication. The user equipments 3 have subscriber identities identifying their own private terminals. The same structure is applied to the user equipments 3.

The security gateway 21 is connected between the H(e) NB 1 and the communication network 22 so as to perform confidential communication with the H(e) NB 1. The security gateway 21 establishes a specific connection of a communication line using a generally know secure channel with the H(e) NB 1 so as to prevent the leakage and wiretapping of communication data. The security gateway 21 employs the encryption of communication information based on the IPsec (Security Architecture for Internet Protocol), the PKI (Public Key Infrastructure), and the tunneling technique for virtually establishing direct lines between the H(e) NB 1 and the security gateway 21. The communication network 22 allows a plurality of radio base stations to connect thereto.

Figures 2, 3:
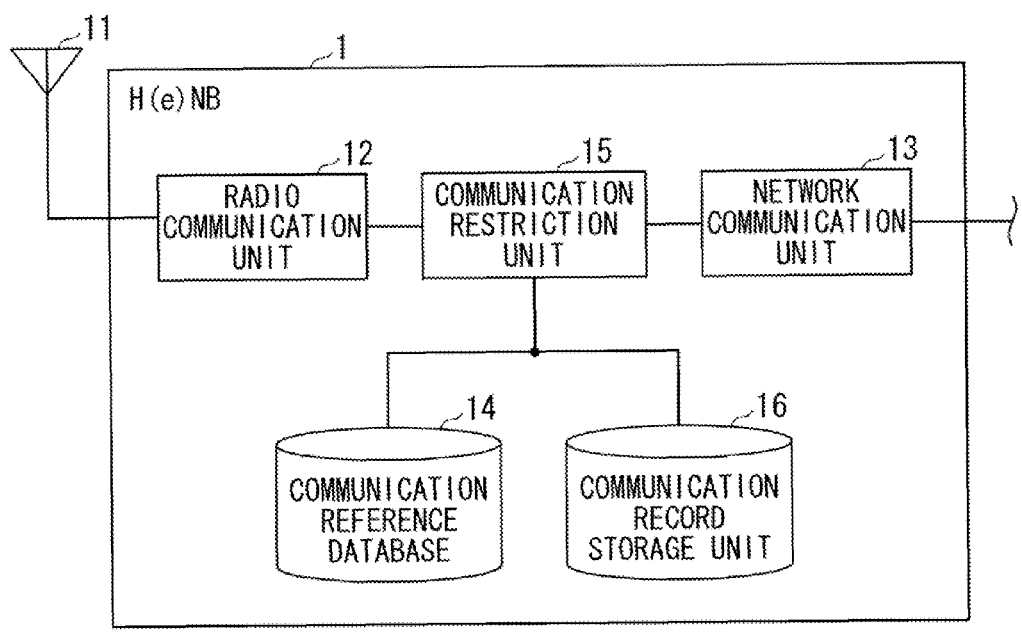
FIG. 2 is a block diagram showing the constitution of the H(e) NB included in the mobile communication system of FIG. 1.
FIG. 3 shows an example of the user communication information in a table form stored in a communication record storage unit included in the H(e) NB shown in FIG. 1.

FIG. 2 is a block diagram showing the constitution of the H(e) NB 1. The H(e) NB 1 includes an antenna 11, a radio communication unit 12, a network communication unit 13, a communication reference database 14, a communication restriction unit 15, and a communication record storage unit 16.

The radio communication unit 12 has a generally known function of performing radio communication via the antenna 11 and/or another function for performing radio communications compatible to the UTRAN (UMTS Terrestrial Radio Access Network) or the E-UTRAN (Evolved UTRAN). The radio communication unit 12 performs radio communications with the user equipments 3 so as to forward packets of received data to the communication restriction unit 15, wherein the radio communication unit 12 also transmits packets of data transferred from the communication restriction unit 15 toward the user equipments 3.

Packets of data transferred between the user equipments 3 and the H(e) NB 1 and between the H(e) NB 1 and the core network 2 include destination addresses and source addresses. In addition, the user equipments 3 have addresses including subscriber identities.

The network communication unit 13 establishes communication lines being connected using secure channels with the security gateway 21 of the core network 2, thus preventing the leakage and wiretapping of transmission/reception data. The network communication unit 13 transmits packets of received data transferred from the security gateway 21 to the communication restriction unit 15, and the network communication unit 13 also transmits packets of data transferred from the communication restriction unit 15 toward the security gateway 21.

The communication reference database 14 stores threshold values of communications for discerning unauthenticated communication from received communication transferred between the user equipments 3 and the core network 2 via the H(e) NB 1. Threshold values of communications (simply referred to as threshold values) are used to make a decision whether or not communications performed between the user equipments 3 and the core network 2 via the H(e) NB 1 are made by way of unauthenticated exploitation. Threshold values are calculated based on the statistics information of communication performed between the user equipments 3 and the H(e) NB 1, wherein the average amounts of communications with the user equipments 3 are used as threshold values.

In the present embodiment, threshold values are defined using communication times which elapse after the user equipments 3 start communication with the core network 2 via the H(e) NB 1 and the amounts of data communicated per unit time. Specifically, the time-related threshold value is set to three hours, for example, so that the H(e) NB 1 discerns communications over three hours as unauthenticated communication with exploitation. In addition, the amount-related threshold value is set to 500 kbps, for example, so that the H(e) NB 1 discerns unauthenticated communication whose amount of data exceeds 500 kbps per unit time with exploitation. It is possible to define unauthenticated communication with exploitation by way of combinations of communication times and amounts of data transferred per unit time.

Unauthenticated exploitation may dominate plenty of bands in data communication performed between the specific user equipment 3 and the H(e) NB 1 and may narrow bands in data communications between the other user equipments 3 and the H(e) NB 1 so as to decrease data transfer speeds.

Communication times and amounts of data transferred per unit time constituting threshold values are determined based on normal communication performed using the H(e) NB 1 by authenticated subscribers. Upon determination of communication times and amounts of data transferred per unit time, the H(e) NB 1 discerns unauthenticated communication, which is not normally made by the authenticated subscriber, from received communication. The subscriber actually installed the H(e) NB 1 and/or the operator who manages and administrates the mobile communication system 100 determine threshold values stored in the communication reference database 14. That is, the subscriber and/or the operator sets up threshold values used for discerning unauthenticated communication with exploitation by way of the core network 2 and/or the user equipment 3.

The communication restriction unit 15 sends packets of data transferred from the radio communication unit 12 to the network communication unit 13, and the communication restriction unit 15 sends packets of data transferred from the network communication unit 13 to the radio communication unit 12. That is, the communication restriction unit 15 relays packets of data between the radio communication unit 12 and the network communication unit 13.

The communication restriction unit 15 monitors packets so as to store the user communication information of each user equipment 3 performing communication with the H(e) NB 1 in the communication record storage unit 16. In addition, the communication restriction unit 15 delays packets of data transferred to the user equipment 3 in response to the number of times the user equipment 3 performs unauthenticated communication with exploitation.

The user communication information of the user equipment 3 includes the subscriber identity identifying the user equipment 3, the number of times the user equipment 3 performs unauthenticated communication with exploitation, and the communication record of the user equipment 3. The communication record stores the start times of communications, which are used to calculate elapsed times of communications. The communication record also stores amounts of communication data in unit time interval, which are used to calculate the amounts of data transferred in communications per unit time.

FIG. 3 shows the configuration of data included in the user communication information of the user equipment 3 stored in the communication record storage unit 16. The user communication information is represented by a two-dimensional table consisting of rows and columns, which lists three items (see top portions of columns) such as the user identity of the user equipment 3 (UE-ID), the policy step (Policy-Step) representative of the number of times the user equipment 3 performs unauthenticated communication with exploitation, and the communication record of the user equipment 3. The user equipments 3 are respectively assigned to plural rows of the table shown in FIG. 3. The initial value of the policy step is set to zero. The present embodiment stops relaying data to the user equipment 3 whose policy step reaches "6" or more.

The communication restriction unit 15 delays packets of data transferred to the user equipment 3 performing unauthenticated communication with exploitation by way of five processes, namely policy steps 1-5, which will be described below.

(Policy Step 1)

The communication restriction unit 15 generates an integer R at random so as to delay transferring a single packet in each group of R packets transferred to the user equipment 3.

(Policy Step 2)

The communication restriction unit 15 lowers the priority level for assigning a radio communication channel to the user equipment 3 performing unauthenticated communication with exploitation in comparison with priority levels of other user equipments 3, thus reducing the number of times in assigning radio communication channels to the user equipment 3.

(Policy Step 3)

The communication restriction unit 15 delays all packets of data from being transferred to the user equipment 3. The communication restriction unit 15 determines a delay time based on the randomly generated integer so as to change the order packets are transferred to the user equipment 3. It is possible to employ interleaving (which is the technique used in error correction) so as to change the order packets are transferred to the user equipment 3.

(Policy Step 4)

The communication restriction unit 15 restricts the number of packets transferred to the user equipment 3 per unit time to the prescribed number which is determined in advance, thus decreasing the throughput of data with respect to the user equipment 3.

(Policy Step 5)

The communication restriction unit 5 generates the integer R at random so as to cancel the prescribed number of packets in each group of R packets within data transferred to the user equipment 3.

According to the policy steps 1, 2, 4, and 5, the communication restriction unit 15 reduces the amount of data transferred to the user equipment 3 in response to the number of times the user equipment 3 performs unauthenticated communication. The policy step 3 does not stipulate that the communication restriction unit 15 reduces the amount of data transferred to the user equipment 3 performing unauthenticated communication, but the policy step 3 does jam the order of packets reaching the user equipment 3 so as to jam streaming playback of audio/visual data. This is an effective measure which dissuades unauthenticated exploiters from exploiting the H(e) NB 1.

Figure 4:
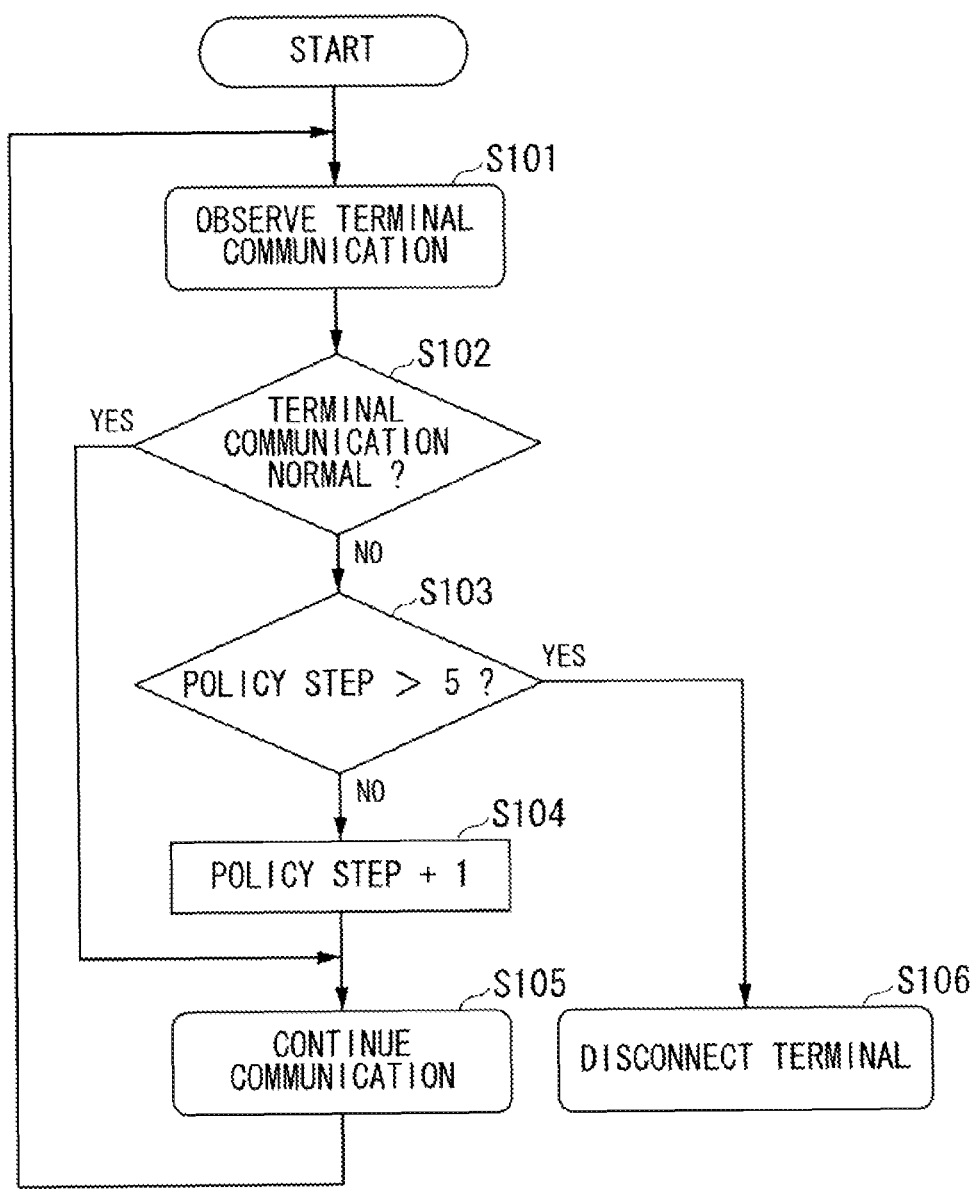
FIG. 4 is a flowchart showing the processing that the H(e) NB performs on the user equipment performing unauthenticated communication with exploitation.

FIG. 4 is a flowchart showing the processing of the H(e) NB 1 on the user equipment 3 performing unauthenticated communication.

(Step S101)

When the radio communication unit 12 and the network communication unit 13 of the H(e) NB 1 starts relaying data between the user equipments 3 and the core network 2, the communication restriction unit 15 stores communication records such as communication start times and the amounts of transferred data in connection with the user equipments 3 connected thereto.

(Step S102)

The communication restriction unit 15 compares communication records of the user equipments 3 with threshold values (which are stored in the communication reference database 16 and are used to discern unauthenticated communication with exploitation), thus determining whether or not the user equipment 3 performs unauthenticated communication with exploitation.

When the communication restriction unit 15 determines that none of the user equipments 3 performs unauthenticated communication with exploitation, the flow proceeds to step S105.

(Step S103)

When the communication restriction unit 15 determines that the user equipment 3 performs unauthenticated communication with exploitation (in which the decision result of step S102 is "NO"), it reads the policy step representing the number of times the user equipment 3 performs unauthenticated communication with exploitation) so as to detect whether or not the read policy step is six or more (in other words, whether or not the read policy step is greater than five).

When the read policy step is six or more (in which the decision result of step S103 is "YES"), the flow proceeds to step S106 in which the communication restriction unit 15 controls the radio communication unit 12 to stop connecting to the user equipment 3.
(Step S104)

When the read policy step is less than six (in which the decision result of step S103 is "NO"), the flow proceeds to step S104 in which the communication restriction unit 15 increases the policy step of the user equipment 3 by one so as to update the policy step stored in the communication record storage unit 16.
(Step S105)

The aforementioned policy steps 1-5 are applied to the user equipments 3 in such a way that the communication restriction unit 15 delays packets transferred to the user equipment 3 performing unauthenticated communication. When the policy step is zero, the communication restriction unit 15 does not reduces the number of packets included in data transferred to the user equipment 3, so that packets of data are normally relayed between the radio communication unit 12 and the network communication unit 13.

Upon a lapse of the predetermined time interval, the H(e) NB 1 repeats the aforementioned steps S101-S106.

By way of the above processing, the H(e) NB 1 delays packets of data from being transferred to the user equipment 3 performing unauthenticated communication, thus reducing a negative influence on other authenticated or trusted subscribers due to the unauthenticated exploitation of the user equipment 3.

The above processing of the H(e) NB 1 inhibits unauthenticated subscribers to secure adequate bands in communications. Finally, the H(e) NB 1 cuts off communications of unauthenticated subscribers so as to prevent any unauthenticated subscribers from unauthentically exploiting the H(e) NB 1. There is a possibility that even the authenticated subscriber temporarily performs unauthenticated communication whose communication record exceeds threshold values stored in the communication reference database 14, so that the authenticated subscriber does not secure adequate bands in communication. In this case, the authenticated subscriber or the operator managing the H(e) NB 1 renews the user communication information stored in the communication record storage unit 16 so as to prevent the policy steps 1-5 from being abruptly applied to other authenticated subscribers.

It is possible to change the order of the policy steps 1-5. The present embodiment exemplifies the five policy steps 1-5 allowing the H(e) NB 1 to delay transferring data; but this is not a restriction. It is possible to increase policy steps by combining the policy steps 1-5.

The present embodiment is designed such that the communication restriction unit 15 delays downlink packets which are transferred to the user equipments 3; but this is not a restriction. It is possible for the communication restriction unit 15 to delay uplink packets which are transferred from the user equipments 3 to the core network 2.

It is possible to set the prescribed value such as one gigabyte per each month as the threshold value defining the amount of data transferred per unit time. This measure is effective to prevent unauthenticated exploitation and to reduce the amount of transferred data by delaying packets of data transferred to the user equipments 3 in response to the communication charge and cost. The H(e) NB 1 of the present embodiment is not only designed to reduce amounts of data transferred by unauthenticated exploiters but also designed to average amounts of data transferred by authenticated subscribers when relatively large deviations exist between the amounts of data transferred by authenticated subscribers.

The present embodiment defines threshold values consisting of communication times and amounts of data transferred per unit time; but this is not a restriction. As threshold values in communications, it is possible to employ other factors such as discriminating events in which a certain amount of uplink/downlink data is transferred in a certain period of time, in which an unauthenticated service is requested, in which an incorrect address is accessed, in which communications are performed using only the low-level layers in the communication system, and in which communications are performed using broad bands which exceed tolerable communication bands allocated to the H(e) NB 1. Since communication concerning the above factors is likely discerned as unauthenticated communication with exploitation, the above factors are effective for the H(e) NB 1 to discern unauthenticated communication with exploitation.

It is possible to install a computer in the H(e) NB 1, wherein the processing for preventing unauthenticated exploitation is drafted as programs and stored in computer-readable storage media; hence, the computer reads programs so as to execute the above processing. Computer-readable media refer to magnetic disks, magneto-optical disks, CD-ROM, DVD-ROM, and semiconductor memories. It is possible to distribute programs to the computer via communication lines, thus allowing the computer to run programs.

Lastly, the present invention is not necessarily limited to the present embodiment, which can be modified in various ways within the scope of the invention as defined by the appended claims.

The invention claimed is:

1. A communication method with a user equipment and a H(e) NB via a core network, comprising:
   relaying data between the user equipment and the core network by way of the H(e)NB;
   comparing user communication information of the user equipment with a threshold value used for discerning unauthenticated communication from received communication; and
   reducing an amount of data transferred between the core network and the user equipment performing the unauthenticated communication;
   wherein the H(e) NB randomly delays packets of data being transferred to the user equipment performing unauthenticated communication, thus reducing the amount of data being transferred.

2. A communication method with a user equipment and a H(e) NB via a core network, comprising:
   relaying data between the user equipment and the core network by way of the H(e)NB;
   comparing user communication information of the user equipment with a threshold value used for discerning unauthenticated communication from received communication; and
   reducing an amount of data transferred between the core network and the user equipment performing the unauthenticated communication;
   wherein a priority level for allocating a channel in radio communication is lowered with respect to the user equipment performing unauthenticated communication, thus reducing the amount of data being transferred.

3. A communication method with a user equipment and a H(e) NB via a core network, comprising:
- relaying data between the user equipment and the core network by way of the H(e)NB;
- comparing user communication information of the user equipment with a threshold value used for discerning unauthenticated communication from received communication; and
- reducing an amount of data transferred between the core network and the user equipment performing the unauthenticated communication;
- wherein the H(e) NB randomly changes an order of packets of data transferred to the user equipment performing unauthenticated communication.

4. A H(e) NB for relaying data between a user equipment and a core network, comprising:
- a network communication unit connected to the core network;
- a radio communication unit transmitting and/or receiving data in connection to the user equipment;
- a communication restriction unit, connected between the network communication unit and the radio communication unit, comparing user communication information of the user equipment with a threshold value used for discerning unauthenticated communication from received communication, thus reducing an amount of data transferred between the core network and the user equipment performing the unauthenticated communication;
- a communication reference database for storing the threshold value in advance; and
- a communication record storage unit storing the user communication information in terms of a subscriber identity of the user equipment, a number of times the user equipment performs unauthenticated communication with exploitation, and a communication record of the user equipment;

wherein:
- the communication restriction unit monitors communications of the user equipment so as to store the communication record in the communication record storage unit, and;
- the communication restriction unit compares the communication record with the threshold value so as to reduce the amount of data transferred between the core network and the user equipment performing unauthenticated communication.

* * * * *